United States Patent [19]

Bankier et al.

[11] Patent Number: 4,886,166
[45] Date of Patent: Dec. 12, 1989

[54] EASEL CASE FOR SOFTWARE HAVING ANTI-PILFERAGE MEANS

[76] Inventors: Jack D. Bankier, 1724 Long Valley Dr., Northbrook, Ill. 60062; Marshall Weinstein, 1900 Clendinen La., Riverwoods, Ill. 60015

[21] Appl. No.: 785,093

[22] Filed: Oct. 4, 1985

Related U.S. Application Data

[63] Continuation of Ser. No. 608,367, May 9, 1984, abandoned.

[51] Int. Cl.$^4$ .................... B65D 85/672; B65D 85/30
[52] U.S. Cl. .............................. 206/387; 190/102; 206/45.23; 206/312; 206/444; 206/472; 206/807; 220/339; 229/71
[58] Field of Search ............... 206/387, 444, 472, 473, 206/45.14, 45.18, 45.2, 45.23, 45.28, 45.34, 309-313, 807; 220/339; 229/71; 190/102, 109; 281/31, 33

[56] References Cited

U.S. PATENT DOCUMENTS

| | | | |
|---|---|---|---|
| 2,190,090 | 2/1940 | Tharp | 281/33 |
| 2,225,048 | 12/1940 | Hasin | 206/312 X |
| 2,631,632 | 3/1953 | Leachman | 190/109 |
| 2,777,574 | 1/1957 | Brody | 206/313 |
| 3,376,872 | 4/1968 | Durham | 206/313 |
| 3,503,141 | 3/1970 | Schwartz | 281/31 |
| 3,640,379 | 2/1972 | Weingarten | 206/387 |
| 3,722,564 | 3/1973 | Croon | 206/312 X |
| 3,823,814 | 7/1974 | Lum | 206/387 X |
| 3,839,809 | 10/1974 | Casar et al. | 281/31 X |
| 3,871,516 | 3/1975 | Holkestad et al. | 206/387 X |
| 3,896,929 | 7/1975 | Mills | 206/387 |
| 3,938,871 | 2/1976 | Bartholemew | 206/387 X |
| 4,002,355 | 1/1977 | Sendor | 206/472 X |
| 4,004,689 | 1/1977 | Glasell | 206/387 |
| 4,058,327 | 11/1977 | Sullivan et al. | 281/33 |
| 4,084,690 | 4/1978 | Pulse | 206/310 |
| 4,255,872 | 3/1981 | Williams, Sr. | 281/31 X |
| 4,264,009 | 4/1981 | Taltam | 206/807 X |
| 4,327,831 | 5/1982 | Inaba et al. | 206/310 |
| 4,356,918 | 11/1982 | Kahle et al. | 206/444 |
| 4,369,879 | 1/1983 | Egly et al. | 206/45.18 |
| 4,381,836 | 5/1983 | Rivlein et al. | 206/387 |
| 4,383,607 | 5/1983 | Lordahl et al. | 206/45.39 |
| 4,433,761 | 2/1984 | Winter et al. | 190/109 |
| 4,457,428 | 7/1984 | Saito | 206/387 X |
| 4,489,832 | 12/1984 | Helms | 206/387 |

FOREIGN PATENT DOCUMENTS

| | | | |
|---|---|---|---|
| 2514187 | 4/1983 | France | 206/387 |
| 679772 | 1/1965 | Italy | 206/312 |
| 118675 | 4/1947 | Sweden | 206/312 |

*Primary Examiner*—Bryon P. Gehman
*Attorney, Agent, or Firm*—Hill, Van Santen, Steadman & Simpson

[57] ABSTRACT

A software storage case comprises a cover and a base which are pivotal with respect to one another to form an easel for supporting documentation. The cover includes a first section for storing flexible magnetic discs and the documentation, while the base includes structure for locating and storing cassettes. The cover and the base both include anti-pilferage devices for the flexible magnetic discs and the cartridges.

37 Claims, 4 Drawing Sheets

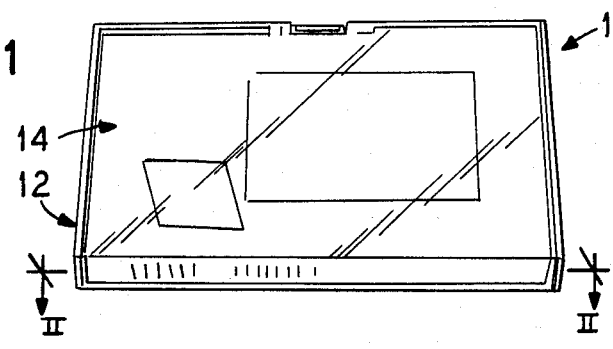
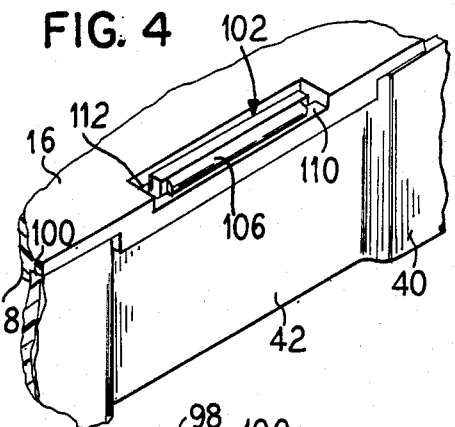
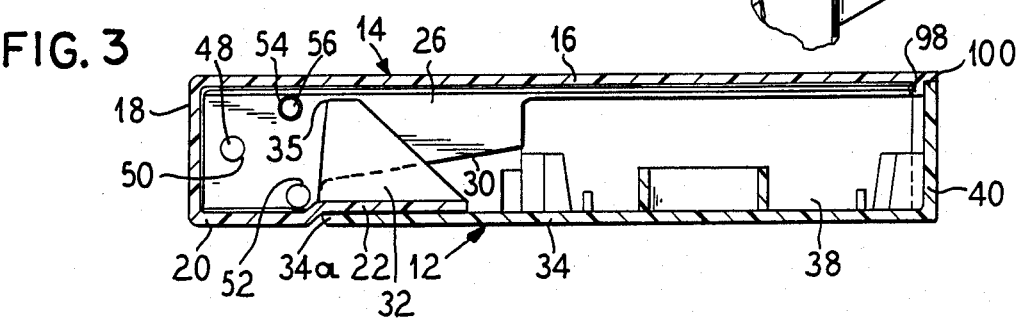
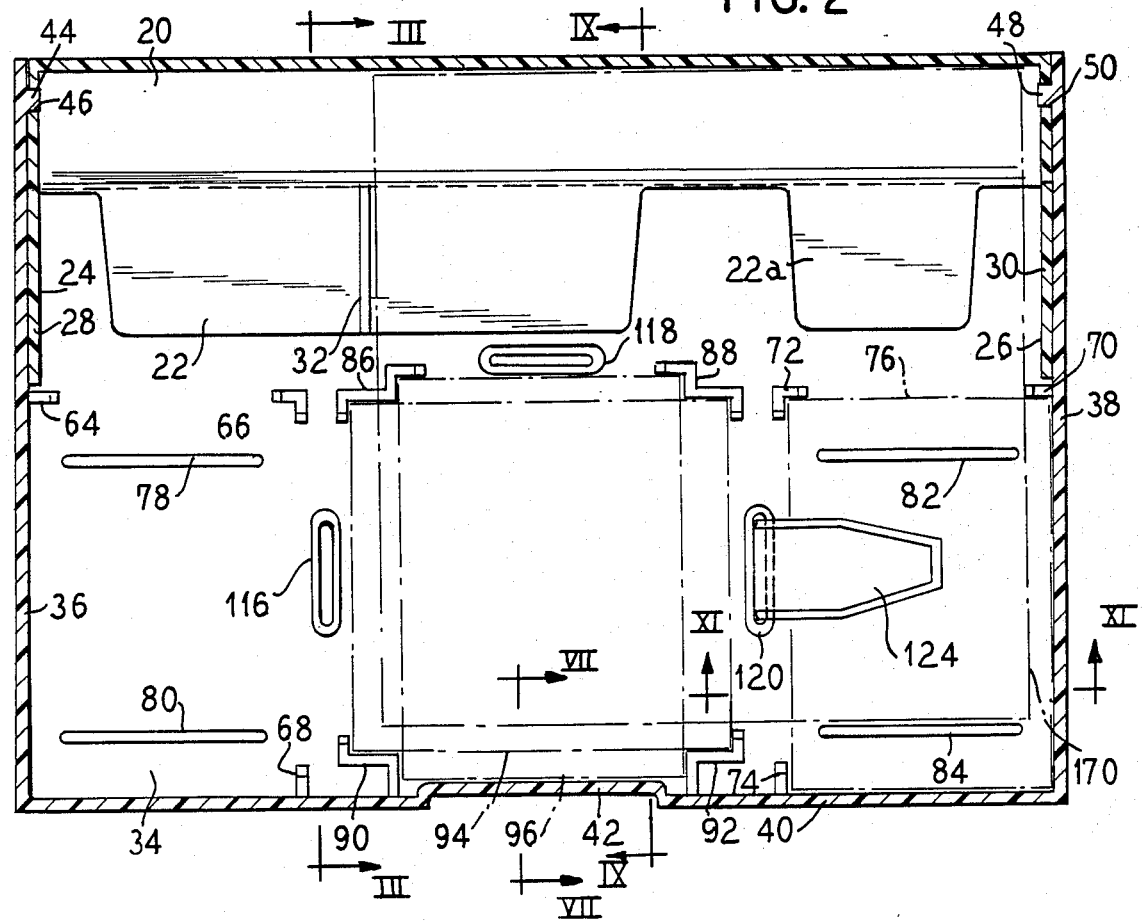

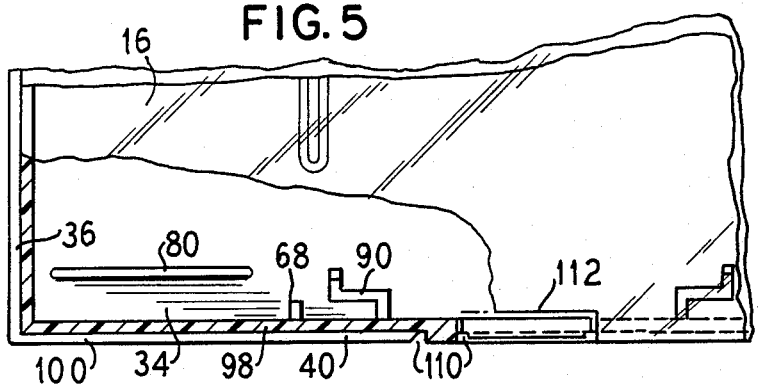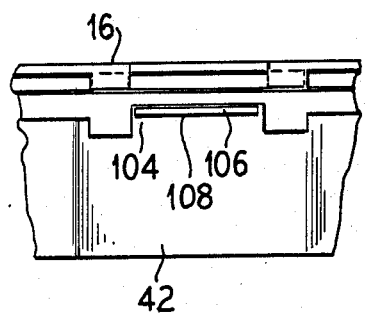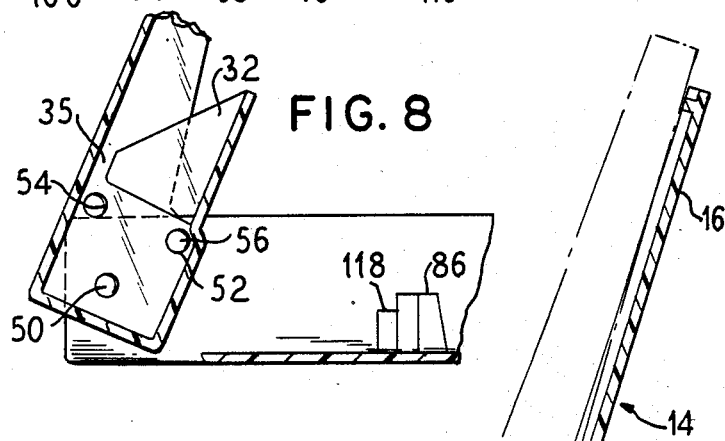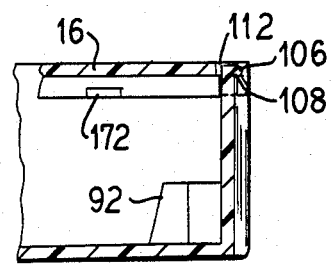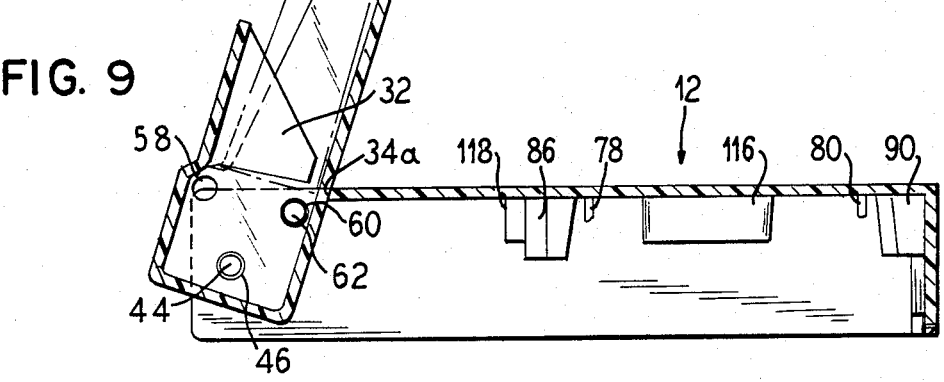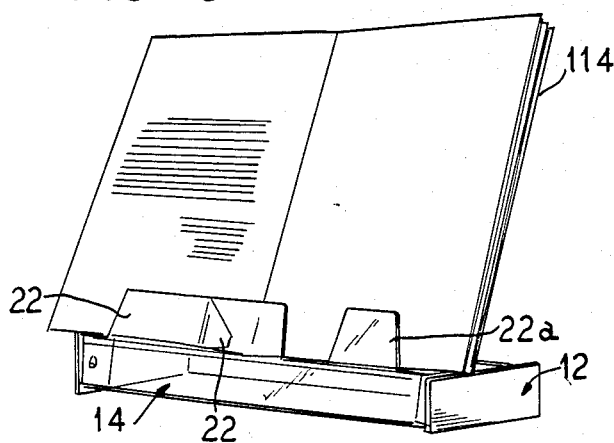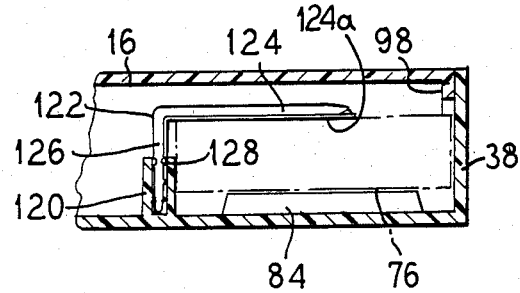

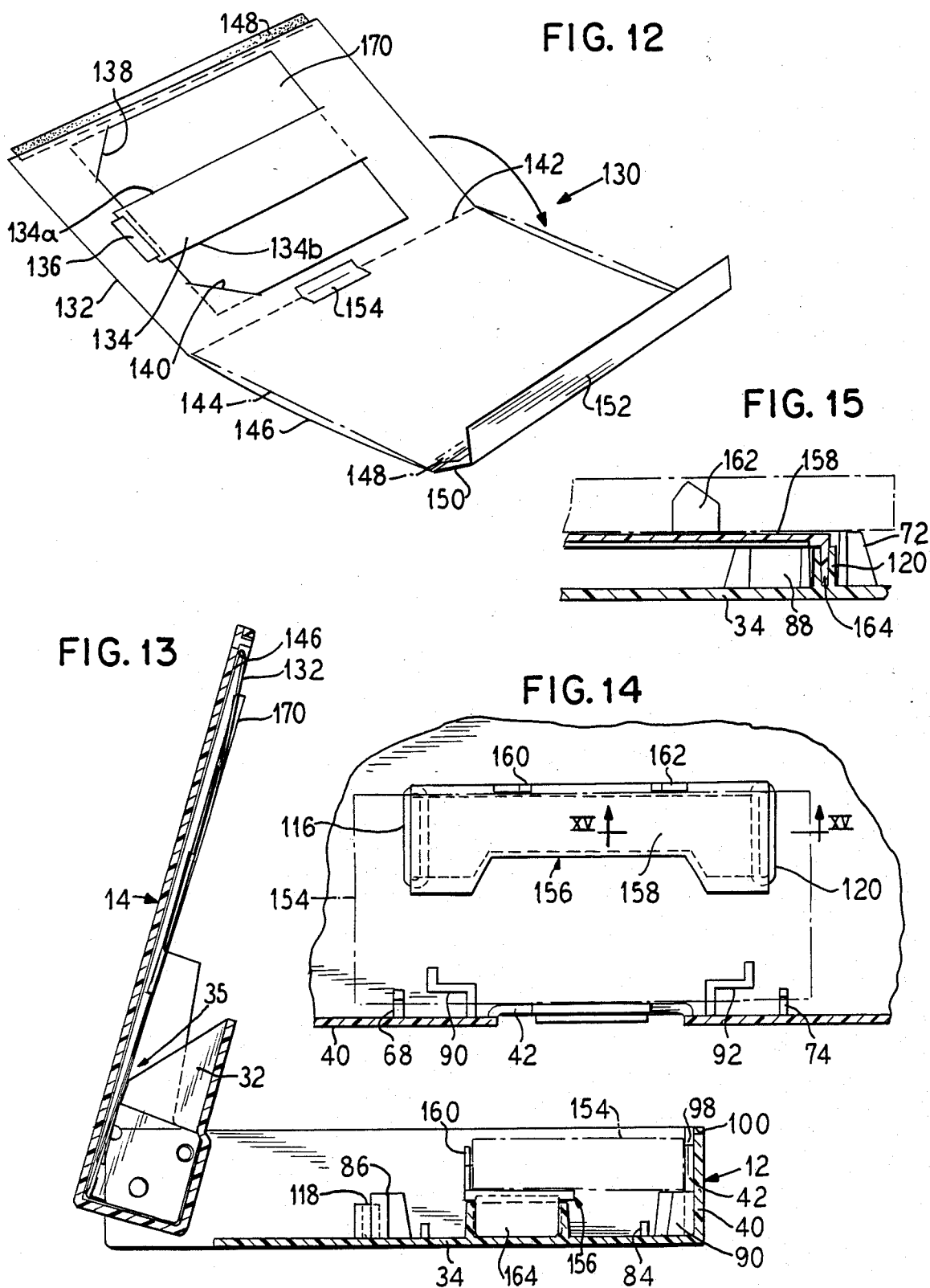

EASEL CASE FOR SOFTWARE HAVING ANTI-PILFERAGE MEANS

This is a continuation of application Ser. No. 608,367, filed May 9, 1984, now abandoned.

1. Field of the Invention

The present invention relates to a universal case for packaging and storing software and associated literature, in particular discs, cartridges and related documentation, and for serving as an easel for the documentation.

2. Description of the Prior Art

U.S. Pat. No. 4,356,918 of Kahle et al discloses a storage container for flexible magnetic discs in which a cover section is rotatable with respect to a base section. The cover section includes a pouch for holding the disc and serves as an easel for the same when the cover is rotated in excess of 270°. The pouch also has a pivotal front wall for increasing the volume thereof to facilitate insertion and removal of the disc.

SUMMARY OF THE INVENTION

The object of the present invention is to provide a universal case for packaging and storing software and associated literature.

Another object of the invention is to provide a case which functions as an easel for the documentation associated with the hardware.

Another object of the invention is to provide a software package which will receive different sizes of cartridges.

Another object of the invention is to provide a case which has a transparent section for receiving a printed sheet therebehind which may serve as a label. Changes of labeling amounts to merely using a different printed sheet.

Another object of the invention is to provide a case which may be opened by a potential purchaser for inspection of the materials therein, while at the same time preventing pilferage of the software.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a pictorial representation of a case constructed in accordance with the present invention;

FIG. 2 is a sectional view of the case generally along the line II—II of FIG. 1;

FIG. 3 is a sectional view of the case taken substantially along the line III—III of FIG. 2 and also including the cover which is only partially illustrated in FIG. 2;

FIG. 4 is a perspective view of the latch portion of the case;

FIG. 5 is a fragmentary section of a portion of the case, also showing the latch, and also illustrating the transparency of the cover;

FIG. 6 is a fragmentary view of the latch portion just prior to latching;

FIG. 7 is a fragmentary sectional view taken substantially along the line VII—VII of FIG. 2 showing also the cover and the latched condition of the cover and base;

FIG. 8 is a fragmentary sectional view as would be seen substantially along the line III—III of FIG. 2 with the cover open to a detent position for access to the software and documentation;

FIG. 9 is a sectional view of the case as would be seen with the base inverted and the cover fully open, as viewed in the direction generally indicated by the parting line IX—IX of FIG. 2 for use as an easel;

FIG. 10 is a perspective view of the case being used as an easel supporting documentation;

FIG. 11 is a fragmentary sectional view taken substantially along the line XI—XI of FIG. 2 showing a first anti-pilferage feature;

FIG. 12 is an open development of the label illustrating a second anti-pilferage feature;

FIG. 13 is a sectional view, similar to that of FIG. 8, showing the structure of FIG. 12 as its positioned prior to use by a purchaser and further showing an adaptor for supporting a different size of cartridge;

FIG. 14 is a fragmentary top view of the adaptor structure of FIG. 13;

FIG. 15 is a sectional view taken along the line XV—XV in FIG. 14; and

DESCRIPTION OF THE PREFERRED EMBODIMENTS

Figure 16:
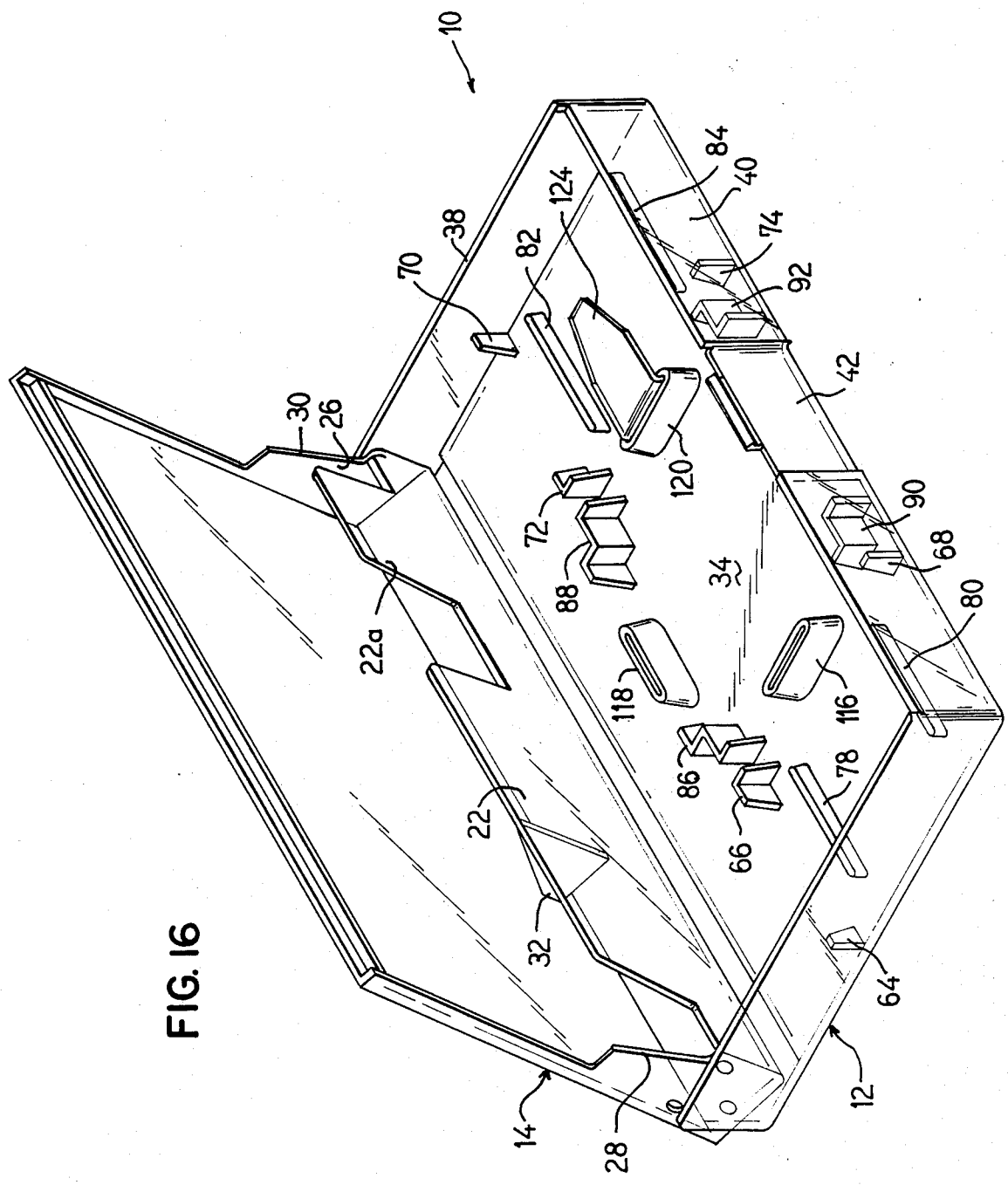
FIG. 16 is a three-dimensional overview of the case constructed in accordance with the present invention.

Referring to FIGS. 1–3, the software case is generally illustrated at 10 as comprising a base 12 and a cover 14.

The cover 14 comprises a top wall 16, an end wall 18, a bottom wall 20, and an offset extended pair of walls 22, 22a. The cover 14 further comprises a pair of sidewalls 24 and 26. The sidewall 24 comprises an oblique edge 28 and the sidewall 26 comprises an oblique edge 30. The oblique edges, as will be appreciated from FIGS. 9 and 10, serve to support and guide the bottom of the documentation for engagement behind the walls 22 and 22a.

The sidewalls 24 and 26 further include sections which extend towards the free end of the cover and joined with a transverse ridge 98 which is received, along with the sidewalls within the cavity formed by the base 12.

The base 12 comprises a bottom wall 34, a pair of sidewalls 36 and 38, and a front wall 40 which is slightly recessed at a wall section 42. The sidewall 36 comprises an integral hinge pin 44 which is received in an aperture 46 of the sidewall 24 of the cover, and a sidewall 38 likewise includes an integral hinge pin 48 which is received in an aperture 50 in the sidewall 26 of the cover.

As best seen in FIG. 3, the sidewall 26 comprises a pair of detent apertures 52 and 54 which receive a detent pin 56 which is also integral with the sidewall 38. In the position illustrated in FIG. 3, the cover is closed and the pin 56 is received in the aperture 54. With the cover open to a first position, as best seen in FIG. 8, the pin 56 is received in the aperture 52. A similar set of apertures 58 and 60 and a similar detent pin 62 are provided at the opposite side of the case, as best seen in FIG. 9.

Referring specifically to FIG. 2, and as partially illustrated in other smaller figures, a plurality of tabs 64, 66 and 68 project from the bottom wall 34 and, together with the sidewall 36 and the front wall 40, define a position for locating and holding a cartridge. Similar structure including a plurality of tabs 70, 72 and 74 are illustrated on the right side of the drawing for holding a cartridge 76 (shown in phantom) therebetween in conjunction with the sidewall 38 and the front wall 40. Inasmuch as some cartridges, such as the cartridge for the IBM TM PC JR., incorporate transverse rib on the bottom side, a pair of similar, oppositely-directed ribs 78, 80 and 82, 84 are provided for supporting a cartridge on each side of its own rib.

In a central area of the bottom wall 34 a plurality of differently shaped tabs 86, 88, 90 and 92 extend from the bottom wall for locating different sizes and shapes of cartridges of other manufacturers, as illustrated in phantom at 94 and 96.

A flexible magnetic disc 170 (shown in phantom) is received and stored in a pocket generally defined by the walls 16, 20, 22 and 30 and by a divider 32 which is connected to the wall section 22 and extends toward, but short of the wall 16 thereby forming a gap 35 (FIGS. 3, 8, 9 and 13). The purpose for the gap 35, as will be evident from the discussion of the label, is to permit the label to lie against the inner surfaces of the walls 16, 18 and 20. As can be seen, therefore, the divider 32 divides an elongate pocket into a pair of pockets, one of which is sized to receive a flexible magnetic disc 170.

Referring now to the right side of FIG. 3, the cover 16 extends beyond the ridge 98 so that its inner surface may engage an upper edge 100 of the front wall 40 when the cover is latched to the base.

Referring to FIGS. 4–7, a latch 102 is illustrated in the area of the front wall section 42 as comprising a resilient member 104 which includes a ramp 106 and a downwardly facing surface 108. As the cover is closed, the ramp 106 engages the distal end of the cover causing the member 104 to yield and be received in a slot 112 which is partially defined by an upwardly facing surface 110. Upon latching, the surface 110 is engaged with the surface 108.

Referring to FIGS. 9 and 10, the case is illustrated as the cover and base would be positioned with respect to one another for use as an easel. As shown, the cover 14 has been rotated in excess of 270° from its closed condition so that the upper surface of the cover rests against the edge 34a of the bottom wall 34. In this position, the cover acts as a support for the documentation which is guided by the edges 28 and 30, as mentioned above so as to rest on the free ends of the sidewalls 36 and 38 and be prevented from sliding off by the sections 22 and 22a as shown in FIG. 10.

The case of the present invention is provided with two anti-pilfering features as briefly mentioned above. The first of these features is illustrated in FIGS. 2 and 11. FIG. 2 shows a plurality of bosses 116, 118 and 120 each defining a slot therein. As illustrated for the cartridge 76, a generally L-shaped hold-down device 122 may be provided. The device 122 comprises a first leg 124 which has a flat distal end surface 124a extending approximately 0.250" while the remainder of the surface in the unstressed state, has a small upward rise of, for example, 0.025" so that the device may be flexed against the cartridge upon insertion of the leg 126 into the slot of the boss 120. The leg 126 is provided with a plurality of barbs 128 so as to prevent removal of the device 122 without breaking the device. This feature therefore discourages pilfering, yet permits the case to be opened by a perspective purchaser.

A second anti-pilfer feature is illustrated in FIGS. 12 and 13. This feature prevents pilfering of the flexible magnetic disc 170 prior to purchase. As best seen in FIG. 12, initially, upon packaging, the label 130 provides the anti-pilfering feature for the flexible magnetic disc 170. As shown, the label 130 comprises a first portion 132 which is hinged at 142 to a second portion 146. The opposite end of the portion 142 comprises two folds defining the section 150 and a section 152 which are to lie against the inner surfaces of the end wall 18 and the wall 20 of the cover 14. The portion 146, actually the undersurface of that portion as shown in FIG. 12, is to be imprinted as the label and lie against the transparent top wall 16. The undersurface of the portion 132 may or may not be printed.

As illustrated, the portion 132 has been slit at 134a, 134b to form a flap 134, and has been further slit at 138, 140. In order to secure the magnetic disc 170, and as illustrated in FIG. 12, two corners thereof are inserted into the slits 138, 140 and the flap 134 is then folded over and secured with an adhesive tape 136. The portion 132 is then folded at the hinge 142 to the position illustrated in phantom at 144 and the edge is sealed with an adhesive tape 148 to the folded portion 150.

An aperture 154 is provided for accommodating the latch.

After packaging as described above the entire packet is placed in the cover, as shown in FIG. 13, and hooked behind a plurality of projections 172 (see FIG. 7).

In order to remove the magnetic disc, after purchase, the user will separate the two portions 132, 146 at the hinge 142, which may be provided as preparations to facilitate opening. Afterward, the disc may be stored in the aforementioned pocket defined by the divider 32, the sidewall 26 and the walls 16, 18, 20, 22 and 22a.

Referring to FIGS. 13–15, the case may also accommodate a further cartridge of different size and shape. Here, a bridge 156 serves in conjunction with the tabs 90 and 92 and the front wall section 42 to support and locate a cartridge 154 (shown in phantom in FIG. 13). The bridge 156 comprises an elongate member 156 having a pair of depending members 164 (only one shown) which are received in the slots defined by the bosses 116 and 120. The upper surface of the member 158 comprises a pair of projections 162. With this mounting of a cartridge, an anti-pilferage hold down device of the type shown in FIG. 11 could be employed in conjunction with the boss 118.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A software comprising:
   a first section including a bottom wall and a plurality of sidewalls extending from said bottom wall and therewith defining a chamber;
   a second section pivotally connected to said first section as a cover therefor;
   locating means mounted in the chamber and defining at least one storage position for at least one software cartridge; and
   frangible single use anti-pilferage means engaging said locating means and locking said at least one software cartridge, whereby breakage of said anti-pilferage means prevents relocking of the said at least one cartridge.

2. The software case of claim 1, wherein said locating means comprises:
a plurality of projections extending from said bottom wall.

3. The software case of claim 2, wherein said locating means further comprises:
at least one of said sidewalls.

4. The software case of claim 1, wherein said locating means comprises:
a plurality of projections extending from said bottom wall and positioned and shaped, in conjunction with at least one sidewall, in conformity with the peripheral rectangular dimensions of a plurality of software cartridges of different sizes.

5. The software case of claim 1, wherein:
a pair of oppositely-disposed sidewalls include respective sidewall sections extending beyond said bottom wall to define a recess;
said second section is pivotally connected within said recess to each of said sidewalls; and
said second section comprises a top wall extending substantially coextensive with said bottom wall between said sections, and end wall extending from said top wall, and a wall section extending from said end wall substantially parallel to said top wall and filling said recess when said case is closed.

6. The software case of claim 5, wherein said second section further comprises:
a further wall section connected to and extending perpendicular to said wall section as a limit element, said top wall, said end wall, said wall section and said further wall section together defining limits for a magnetic disk to be received therebetween and against said end wall.

7. A software case comprising:
a bottom including a bottom wall having an edge, sidewalls extending from said bottom wall and having edges, a pair of sidewall sections extending beyond said edge;
said bottom further including locating means for receiving and locating at least one first software element and including a slot, and frangible means including a first member for non-releasable engagement in said slot and a second member for holding the software element against said bottom; and
a cover rotatably connected to said sidewall sections and rotatable between a first position at which said case is closed and a second position greater than 270° from said first position at which said cover engages said edge of said bottom wall and said case may rest on said edges of said sidewalls to serve as an easel,
said cover comprising pocket means defining a plurality of pockets of predetermined different sizes for receiving materials of corresponding different sizes, said pocket means comprising three walls including a first wall, a second wall parallel to said first wall, and a third wall connecting said first and second walls in a trough structure and a divider projecting from one of said three walls,
whereby documentation may be positioned on said first wall and said sidewall sections and maintained in such position by said second wall.

8. The software case of claim 7, wherein:
said divider extends from said second wall towards said first wall to define a first pocket of a first length and a second pocket of a greater second length.

9. The software case of claim 7, wherein:
said divider projects a predetermined distance from one of said walls to define a first and second aligned pockets and a third pocket parallel to and co-extensive with said first and second pockets.

10. The software case of claim 7, wherein:
said bottom and said cover comprise cooperate latch means.

11. The software case of claim 7, wherein:
said cover comprises transparent material.

12. The software case of claim 7, wherein:
said base comprises locating means defining a plurality of land areas of predetermined sizes each for receiving a respective software cartridge.

13. The software case of claim 12, wherein:
said locating means comprises a plurality of projections extending from said bottom wall.

14. The software case of claim 13, wherein:
said projections are spaced from said sidewalls and comprise predetermined shapes which together with said sidewalls define said land areas.

15. The software case of claim 12, wherein:
said locating means comprises a plurality of said slots; and
said frangible means comprises elongate bars and legs extending perpendicular to said bars and non-releasably received in respective ones of said slots.

16. The software case of case 12, wherein:
at least one of said land areas comprises at least two projections extending from said bottom wall for supporting a respective software cartridge.

17. A software case comprising:
a cover including first means for storing a magnetic disk and second means for storing documentation;
a base pivotally connected to said cover and including a closed side, an open side and third means for storing a plurality of cartridges of different predetermined sizes and shapes;
single use frangible anti-pilferage locking means for engaging said base and locking the plurality of cartridges thereto to prevent pilferage; and
a rotatable connection of said cover to said bottom providing said pivotal connection for rotation of said cover from a closed position at which said cover engages said open side to a position at which said cover engages said closed side and at which said open side serves as a stand and the cover serves as an easel.

18. A software case comprising:
a base including first means for receiving and locating at least one first software element;
single use frangible anti-pilferage locking means for locking the first software element to said base to prevent pilferage thereof; and
a cover pivotally connected to said base and including second means for receiving and locating at least one second software element.

19. The software case of claim 18, wherein:
said second means comprises a trough-shaped structure including a limit element disposed transversely thereof; and
said cover comprises a sidewall as a second limit element, said limit elements and said trough-shaped structure defining a receptacle for the second software element.

20. The software case of claim 18, wherein:
said base comprises a bottom wall and a plurality of sidewalls; and said first means comprises a plurality of tabs extending from said bottom wall and defining a land area for receiving at least one cartridge which is locked by said frangible locking means.

21. The software case of claim 18, wherein:
said base comprises a bottom wall and a plurality of sidewalls; and
said first means comprises a plurality of tabs extending from said bottom wall and, together with said sidewalls, defining a plurality of land areas of different peripheries for receiving a plurality of correspondingly dimensioned cartridges which are locked to said base by said frangible locking means.

22. The software case of claim 18, and further comprising:
third means carried by said base and defining a slot; and
said single use frangible anti-pilferage locking means including a first member for non-releasable engagement in said slot and a second member for holding the first software element against said base.

23. The software case of claim 18, and further comprising:
a pair of third means defining slots, said third means carried spaced apart on said base; and
an adapter for adapting said base to receive and locate a further software element, said adapter comprising an elongate member for supporting the further software element and a pair of legs depending from said elongate member to be non-releasably received in said slots.

24. The software case of claim 18, and further comprising:
third and fourth means respectively carried by said base and said cover and engageable and cooperable with one another to hold said cover in a first open position; and
fifth and sixth means respectively carried by said base and said cover and engageable and cooperable with one another to hold said cover in a second open position.

25. The software case of claim 24, wherein: said third means comprises a detent pin; and
said fourth means comprises an aperture to receive said detent pin when said cover is pivoted to the first open position.

26. The software case of claim 25, wherein:
said fourth means defines a further aperture for receiving said detent pin when said cover is closed.

27. The software case of claim 24, wherein:
said fifth means comprises a wall; and
said sixth means comprises a wall.

28. The software case of claim 18, and further comprising:
a first latch element carried on said base; and
a second latch element carried on said cover for releasable engagement with said first latch element.

29. The software case of claim 28, wherein:
said first latch element comprises a resilient member and a first surface on said resilient member facing in a first direction; and
said second latch element comprises a second surface facing opposite said first surface and releasably engageable therewith when said cover is closed.

30. The software case of claim 18, and further comprising:
third means releasably mounting said second means in said cover.

31. The software case of claim 18, wherein:
said second means comprises a folder securing the second software element against pilferage and at least partially encasing the second software element.

32. The software case of claim 31, wherein:
said cover includes a transparent wall; and
said folder comprises indicia visible through said transparent wall identifying the software.

33. The software case of claim 32, wherein:
said folder comprises first and second sections hinged to one another;
slits in one of said sections receiving respective portions of the second software element; and
means securing said first and second sections together with the software element therebetween.

34. The software case of claim 33, wherein:
the last-mentioned means comprises an adhesive tape.

35. The software case of claim 33, wherein:
said first and second sections are hinged together along a perforate line.

36. A software case comprising:
a cover including first means for storing and preventing pilferage of a magnetic disk, said first means adapted to release the magnetic disk for use, second means for storing the magnetic disk after the magnetic disk has been released, and third means for storing documentation;
a bottom including a closed side, and open side and fourth means for storing a plurality of cartridges of different predetermined sizes and shapes including single use frangible anti-pilferage means for locking the cartridges and preventing pilferage prior to use; and
a rotatable connection of said cover to said bottom for rotation of said cover from a closed position at which said cover engages said open side to a position at which the cover engages said closed side and at which said open side serves as a stand and said cover serves as an easel.

37. The software case comprising:
a cover including first means for storing flexible magnetic disks and second means for storing documentation;
a base including a closed side, an open side and third means for storing a plurality of cartridges of different predetermined sizes and shapes;
single use frangible anti-pilferage locking means connected to said base for locking the cartridges thereto to prevent pilferage;
a rotatable connection of said cover to said bottom for rotation of said cover from a closed position at which said cover engages said open side to a position at which said cover engages said closed side and at which said open side serves as a stand and said cover serves as an easel;
said base includes walls for partially supporting the documentation when said cover serves as an easel; and
said cover includes walls for partially supporting the documentation when said cover serves as an easel.

* * * * *